(12) United States Patent
Park et al.

(10) Patent No.: US 6,516,125 B1
(45) Date of Patent: Feb. 4, 2003

(54) DISPERSION SHIFTED OPTICAL FIBER HAVING TRIPLE CLAD

(75) Inventors: Hye Young Park, Seoul (KR); Kwon Moo Lee, Kyungki-do (KR); Joon Hyung Cho, Kyungki-do (KR)

(73) Assignee: LG Cable Ltd., Seoul (KR)

( * ) Notice: Subject to any disclaimer, the term of this patent is extended or adjusted under 35 U.S.C. 154(b) by 0 days.

(21) Appl. No.: 09/622,521

(22) PCT Filed: Dec. 14, 1999

(86) PCT No.: PCT/KR99/00766
§ 371 (c)(1),
(2), (4) Date: Aug. 17, 2000

(87) PCT Pub. No.: WO00/36444
PCT Pub. Date: Jun. 22, 2000

(30) Foreign Application Priority Data

Dec. 17, 1998 (KR) .............................. 98-55561

(51) Int. Cl.[7] .............................. G02B 6/02; G02B 6/22
(52) U.S. Cl. ....................................... 385/127; 385/123
(58) Field of Search ................................ 385/122, 123, 385/124, 126, 127, 128

(56) References Cited

U.S. PATENT DOCUMENTS

| | | | |
|---|---|---|---|
| 4,755,022 A | * | 7/1988 | Ohashi et al. .............. 385/127 |
| 4,852,968 A | | 8/1989 | Reed |
| 5,327,516 A | | 7/1994 | Chraplyvy |
| 5,559,921 A | | 9/1996 | Terasawa et al. |
| 5,732,178 A | | 3/1998 | Smith |
| 5,748,824 A | | 5/1998 | Terasawa et al. |
| 5,852,701 A | * | 12/1998 | Kato et al. .................. 385/127 |
| 5,905,838 A | * | 5/1999 | Judy et al. .................. 359/109 |
| 5,946,439 A | * | 8/1999 | Terasawa et al. .......... 385/123 |
| 5,956,448 A | * | 9/1999 | Smolka et al. ............. 385/124 |
| 6,205,279 B1 | * | 3/2001 | Kim et al. .................. 385/124 |
| 6,301,422 B1 | * | 10/2001 | Li .............................. 385/127 |
| 6,307,993 B1 | * | 10/2001 | Paek et al. .................. 385/123 |

FOREIGN PATENT DOCUMENTS

| | | |
|---|---|---|
| EP | 0 724 171 | 7/1996 |
| EP | 0 789 257 | 8/1997 |
| EP | 0 856 754 | 8/1998 |
| JP | 56-164306 | 12/1981 |
| KR | 1997-0011523 | 7/1997 |

* cited by examiner

Primary Examiner—Rodney Bovernick
Assistant Examiner—Scott A Knauss
(74) Attorney, Agent, or Firm—Ladas & Parry (57) ABSTRACT

The present invention is related to a dispersion-shifted optical fiber for use in a wavelength division multiplexing system, which comprises a core, an inner clad, and a silica clad, wherein the optical fiber has a relatively low dispersion at a wavelength of 1550 nm, an effective area of 60 $\mu m^2$ and small bending loss. The core consists of a first and a second core, wherein the core has a refractive index distribution. The inner clad consists of a first inner clad having a refractive index smaller than that of the second core and a second inner clad having a refractive index smaller than that of the second inner clad. A silica clad surrounds the inner clad and has a refractive index smaller than that of the second inner clad.

7 Claims, 6 Drawing Sheets

DISPERSION SHIFTED OPTICAL FIBER HAVING TRIPLE CLAD

TECHNICAL FIELD

The present invention relates to a dispersion shifted optical fiber and, more specifically, relates to a dispersion shifted optical fiber having a core, an inner clad, and a silica clad which is suitable for the use in wavelength division multiplexing system. In addition, the present invention relates to the dispersion shifted optical fiber which has a low dispersion at a wavelength of 1550 nm, and an effective area of 60 $\mu$m$^2$ or more without degradation in bending performance.

BACKGROUND ART

The introduction of an optical amplifier in the field of optical communication system makes it possible for a wavelength division multiplexing method to be available. The wavelength division multiplexing method contributes to the increased transmission capacity but causes undesirable non-linear effects that have serious influence on transmission characteristics of the optical fiber. The non-linear effects results from a high power density, i.e., a high power per unit area. Thus, it is possible to reduce the non-linear effects by increasing an effective area of the optical fiber. The increase of the effective area, however, results in the increase of the undesirable bending loss. As such, a new design of the optical fiber has been requested which properly controls both optical characteristics, i.e., the effective area and the bending loss.

Among non-linear effect, four wave mixing creates light having a new wavelength from the interference between lights having different wavelengths, thereby causing the distortion of light signal. The four wave mixing occurs at wavelength where the dispersion is zero, i.e., when lights are in-phase with each other. Thus, if the optical fiber has the low dispersion within erbium-doped fiber amplifier ("EDFA") gain band, the four wave mixing does not occur.

The conventional design of the optical fiber is that a clad having a relatively low refractive index surrounds a core having a relatively high refractive index. Each portion has a larger refractive index than that of pure silica clad by doping a germania thereto. Such design of the optical fiber is disclosed in U.S. Pat. Nos. 5,559,921 and 5,327,516.

The above-mentioned design of the optical fiber makes it possible to obtain the relatively low dispersion at the wavelength of 1550 nm by adjusting radius and the refractive index of the core. Due to the dispersion, the resultant optical fiber can suppress the four wave mixing. However, the optical fiber having this design has a problem caused from the large refractive index difference between the core and the clad: the light concentrates on the core because of the large index difference, and, therefore, the optical fiber can accomplish the decreased bending loss but has the decreased effective area.

Alternatively, there has been a conventional optical fiber design that includes various portions having different radii and refractive indices one another. For example, if the optical fiber design includes three portions, at least one of three portions has a refractive index smaller than or equal to that of pure silica clad and other two portions have refractive indices equal to or larger than that of pure silica clad. Germania is doped into the portions having large refractive indices, whereas Fluoride is doped into the portion with small refractive index. Such design is disclosed in U.S. Pat. Nos. 5,748,824 and 4,852,968.

Such optical fiber design makes it possible for the resultant optical fiber to obtain the low dispersion at the wavelength of 1550 nm by adjusting refractive indices and radii of the various portions in tile optical fiber. As a result, the optical fiber does not suffer from the four wave mixing. The above-mentioned optical fiber structure is designed that the refractive index of each portion is repeatedly increased or decreased in reference to the refractive index of the silica clad. Such distribution of the refractive index results in increasing the effective area and, at the same time, causes the bending loss to increase because the light spreads through various portions. Thus, the above-mentioned optical fiber can provide the large effective area but still has a problem of the increased bending loss.

SUMMARY OF INVENTION

In order to solve the above-mentioned problems in the prior art, the present invention provides an optical fiber having triple clad, which is suitable for the use in the wavelength division multiplexing system that is served by erbium-doped fiber amplifier.

It is an object of the present invention to provide the optical fiber that has a relatively low dispersion at the wavelength of 1550 nm to suppress the four wave mixing.

In addition, it is the object of the present invention to provide the optical fiber that has an effective area equal to or larger than 60 $\mu$m$^2$ along with the decreased bending loss.

DISCLOSURE OF INVENTION

In order to accomplish the above-mentioned object, the present invention provides a dispersion shifted optical fiber, which comprises: a core having a refractive index distribution ($n_{core}$); an inner clad that surrounds the core and has a refractive index distribution ($n_{clad}$); and, a silica clad surrounding the inner clad and having a refractive index ($n_{silica}$). The core comprises: a first core having a refractive index (n1) that is uniform over its radius (a1); and a second core surrounding the first core and having a refractive index (n2) that is gradually decreased over its radius (a2). The inner clad comprises: a first inner clad surrounding the second core and having a refractive index (n3) that is uniform over its radius (a3) and a second inner clad surrounding the first inner clad and having a refractive index (n4) that is uniform over its radius (a4); and, wherein the refractive indices of the first and second cores, the first and second clads, and the silica clad satisfy a relationship of n1>n2>n3>n4>$n_{silica}$.

According to other aspect, the present invention provides a dispersion shifted optical fiber, which comprises: a core having a refractive index distribution ($n_{core}$); an inner clad that surrounds the core and has a refractive index distribution ($n_{clad}$); and, a silica clad surrounding the inner clad and having a refractive index ($n_{silica}$). The core comprises: a first core having a refractive index (n1) that is gradually increased from an initial refractive index (n0) over its radius (a1); and a second core surrounding the first core and having a refractive index (n2) that is gradually decreased over its radius (a2). The inner clad comprises: a first inner clad surrounding the second core and having a refractive index (n3) that is uniform over its radius (a3) and a second inner clad surrounding the first inner clad and having a refractive index (n4) that is uniform over its radius (a4). The maximum refractive index of the second core is larger than a minimum refractive index of the first core, and the refractive indices of the second core, the first and second inner clads and the silica clad satisfy a relationship of n2>n3>n4>$n_{silica}$.

According to another aspect, the present invention provides optical fiber that accomplishes both large effective area and decreased bending loss by adjusting radii and refractive indices of two inner clads.

Based on the above structure, the present invention can provide the dispersion-shifted optical fiber having triple clad which is suitable for the use in the wavelength division multiplexing communication system; the optical fiber according to the present invention can suppress the non-linear effects by having the low dispersion and the effective area of 60 $\mu m^2$ or more at the wavelength of 1550 nm. In addition, the optical fiber according to the present invention can accomplish increased effective area and decreased bending loss at the same time.

In addition, the present invention provides the optical fiber that can be easily fabricated through simplified fabrication process because of the simple refractive index profile.

BEST MODE FOR CARRYING OUT THE INVENTION

Hereinbelow, the preferred embodiments of the present invention are explained referring to the attached drawings.

Figure 1:
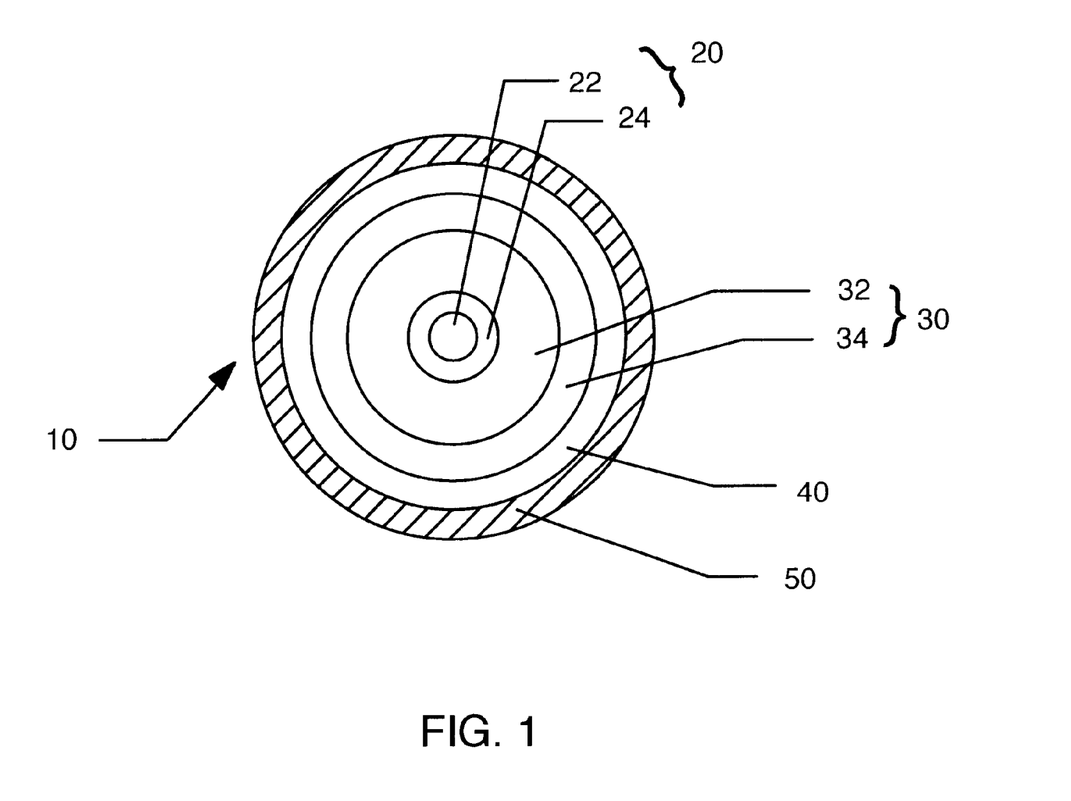
FIG. 1 is a cross sectional view of the optical fiber according to one example of the present invention.
Figure 2:
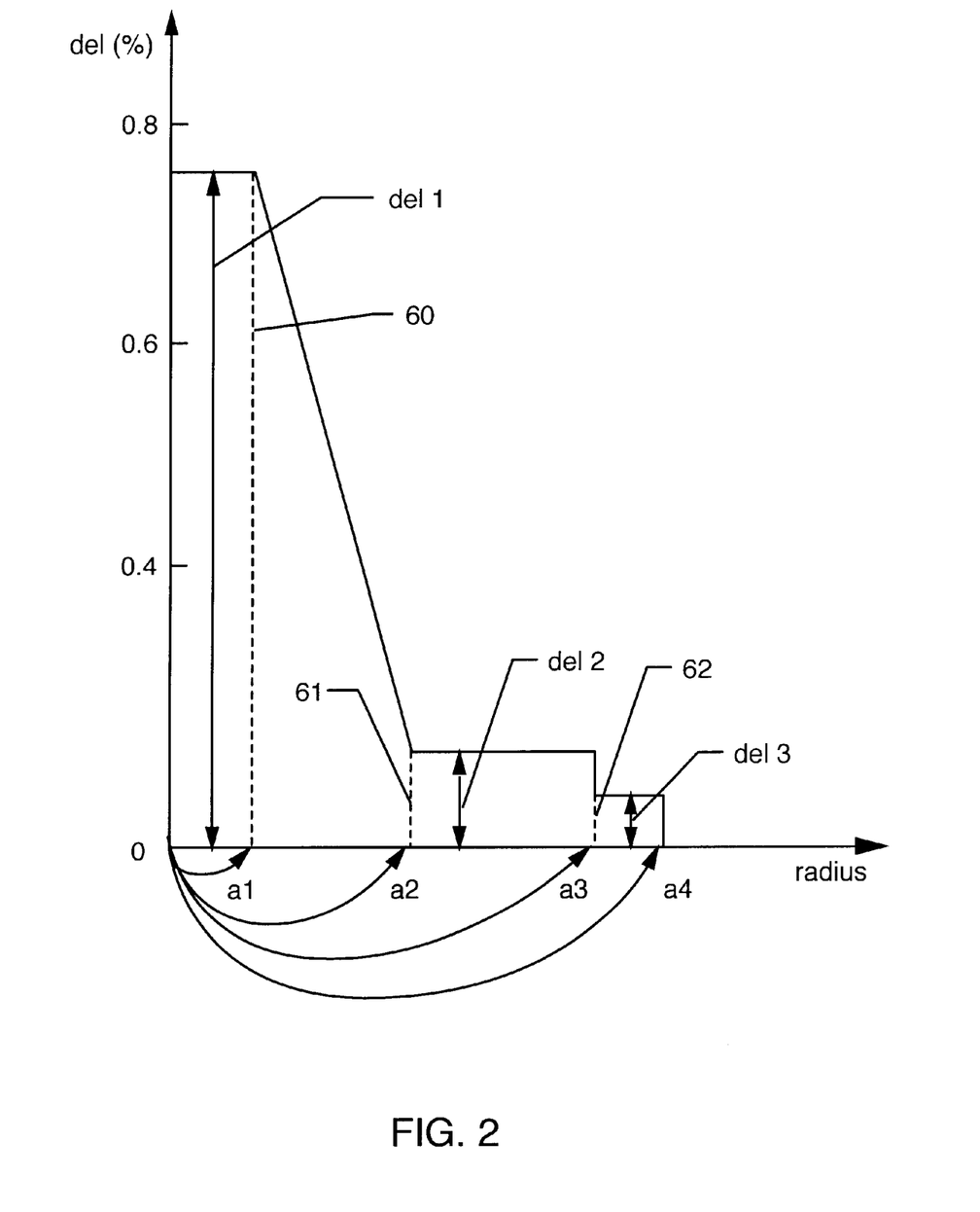
FIG. 2 showers a design of the optical fiber according to one example of the present invention, whose first core has a uniform refractive index over its radius.
Figure 3:
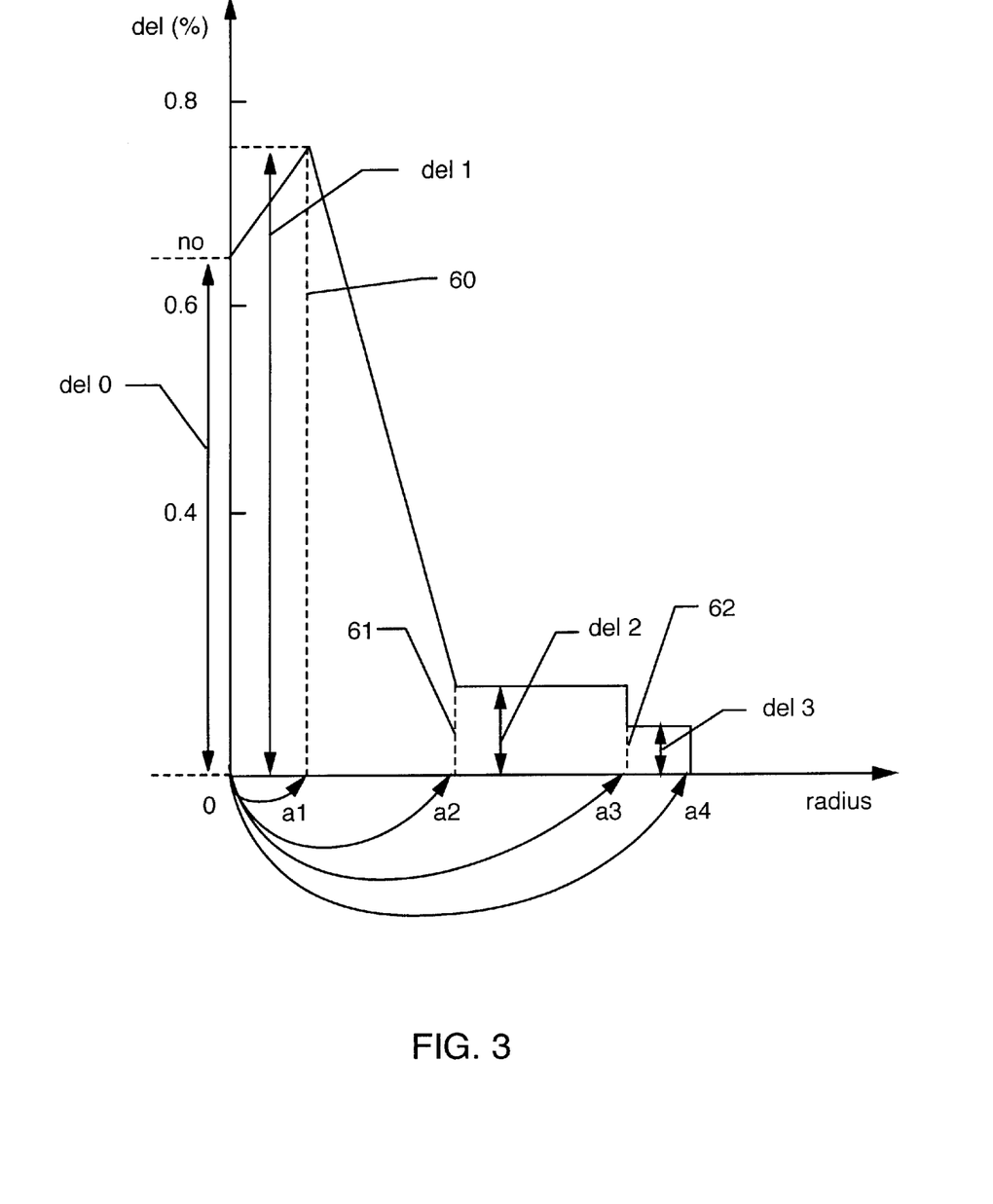
FIG. 3 shows a design of the optical fiber according to one example of the present invention, whose first core has an increased refractive index over its radius.

FIG. 1 shows a cross sectional view of the optical fiber of one example according to the present invention and FIG. 2 shows a design of the optical fiber according to the present invention whose first core has a uniform refractive index over its radius. FIG. 3 shows a design of the optical fiber according to the present invention whose first core has a gradually increased refractive index over its radius.

First, as shown in FIGS. 1 and 2, the optical fiber according to the present invention includes a core (20) whose refractive index is $n_{core}$ and an inner clad (30) which surrounds the core (20) and has a refractive index ($n_{clad}$) smaller than that ($n_{core}$) of the core (20).

The core (20) is divided into a first core (22) which is disposed in the most inner portion of the optical fiber and a second core (24) that surrounds the first core (22). The first core (22) has a refractive index which is either uniform or gradually increasing over its radius from the center axis of the optical fiber to a first outer boundary (60) where the first core (22) is disposed adjacent and around the second core (24). If the refractive index (n1) of the first core (22) is increased over its radius, it has an initial value (n0) and is gradually increased over the radius beginning from the initial value (n0).

On the other hand, the second core (24) has a refractive index that decreases from the first outer boundary (60) to a second outer boundary (61) where the second core (24) is disposed adjacent and around the inner clad (30). Thus, the core (20) has a refractive index distribution.

The inner clad (30) that surrounds the core (20) consists of the first inner clad (32) and the second inner clad (34). The first inner clad (32) has a uniform refractive index (n3) from the second outer boundary surface (61) to a third outer boundary surface (62) where the first inner clad (32) is disposed adjacent and around the second inner clad (34). The second inner clad (34) surrounds the first inner clad (32) and has a uniform refractive index (n4) that is smaller than that of the first inner clad (32). Thus, the inner clad (30) has a step refractive index profile.

A silica clad (40) surrounds the inner clad (30) having the first inner clad (32) and the second inner clad (34). The silica clad (40) has a refractive index ($n_{silica}$) which is smaller than that (n4) of the second inner clad (34).

The above-mentioned refractive indices (n1, n2, n3 and n4) of the first core, the second core, the first inner clad and the second inner clad are a function of their radius (a1, a2, a3 and a4), respectively. Also, the refractive indices (n1, n2, n3 and n4) substantially satisfy the relationship of n1>n2>n3>n4. In case that the refractive index (n1) of the first core is gradually increased over its radius (a1), however, a maximum refractive index of the second core may be larger than a minimum refractive index of the first core.

In FIG. 1, reference numeral (50) indicates a coating for protecting the inner part of the optical fiber, compensating for strength, easy handling, etc.

As mentioned above, the optical fiber according to the present invention includes the core (20) and the inner clad (30) surrounding the core (20). The core (20) and the inner clad (30), respectively, have two divided portions that have different radii and refractive indices from each other. In other words, the core (20) is divided into the first core (22) having a radius, a1, the index n1 and the second core (24) having a radius a2, the index n2. The inner clad (30) is divided into the first inner clad (32) having a radius, a3, the index n3 and the second inner clad (34) having a radius, a4, index n4. In sum, the optical fiber (10) includes four portions that have significant influence on the transmission characteristics of the optical fiber and that have the relationship among the radii, a1<a2<a3<a4.

Among the above four portions, the first and second cores (22, 24) of the optical fiber relate to the control of the dispersion characteristics of the optical fiber, whereas the first and second inner clads (32, 34) relate to the control of the effective area and the bending loss. Thus, it is possible to control the dispersion characteristics of the optical fiber by adjusting the refractive indices and the radii of the first and second cores (22, 24). It is also possible to control the optical characteristics of the optical fiber, such as the effective area and the bending loss, by adjusting the design characteristics (i. e., the radii and the indices) of the first and second inner clads (32, 34).

Based on Examples 1 and 2 herein below, the control of the design characteristics of the first and second cores (22, 24) and the first and second inner clads (32, 34), and the changes in the effective area and the bending loss from such control are described in detail.

EXAMPLE 1

The Example 1 corresponds to the optical fiber design as shown in FIG. 2. In the present example, the first core (22) has the refractive index (n1) that is uniform over its radius (a1) as shown in FIG. 2.

In the present example, the inventors of the present invention are intended to implement the optical fiber, which has the dispersion of 1.5–3.5 ps/nm-km at the wavelength of 1550 nm, the effective area of 60–70 $\mu m^2$, and the 32 mmψ bending loss of 0.02 dB or less from the optical fiber design as shown in the FIG. 2. The inventors performed a number of simulations by using a numerical method known in the optical fiber design field.

During the simulations, the inventors of the present invention set the ranges of the radii (a1, a2) of the first and second cores (22, 24) as 1.0±0.15 $\mu m$ and 2.3±0.15 $\mu m$, respectively. Also, the inventors set the range of index differences of the first core (22), del1(%) as 0.73±0.03%. Herein, the del1(%) is defined and calculated from the formula, del1 (%)=[(n1−$n_{silica}$)/$n_{silica}$]×100.

Meanwhile, for the first and second clads (32, 34), the inventors set the ranges of their radii (a3, a4) as 6.5±1.5 $\mu m$ and 9.0±1.0 $\mu m$, respectively, and set the ranges of the index differences del2(%) and del3(%) as 0.11±0.03% and 0.07±0.03%, respectively. Herein, the index differences del2 (%) and del3(%) are defined and calculated from the formulas, del2(%)=[(n2−$n_{silica}$)/$n_{silica}$]×100 and del3(%)= [(n3−$n_{silica}$)/$n_{silica}$]×100. As the result of the simulation, the inventors found that when the first and second cores (22, 24) and the first and second inner clads (32, 34) were designed to have the values within the above ranges, the resultant optical fiber had the optical characteristics which the inventors intended to achieve.

More preferably, the inventors of the present invention set the radii (a1, a2, a3 and a4) of the first and second cores (22, 24) and the first and second inner clads (32, 34) as fixed values, i.e., 1.0 $\mu m$, 2.3 $\mu m$, 6.5 $\mu m$ and 9.0 $\mu m$, respectively. In addition, the inventors set the index differences, del1(%), del2(%) and del3(%) as fixed values, 0.73%, 0.11% and 0.07%. These fixed values correspond to the center values of the ranges as mentioned above. The inventors found that the optical fiber design having the above fixed values made it possible to implement the optical fiber having the most desirable optical characteristics. Namely, if the optical fiber were designed and fabricated with the above values, the resultant optical fiber has the dispersion of 3.3 ps/nm-km, the effective area of 69 $\mu m^2$, and the 32 mmψ bending loss of 0.01 dB or less.

The optical fiber according to the present example can sufficiently suppress the non-linear effects including the four wave mixing when it is used for the wavelength division multiplexing optical communication system.

EXAMPLE 2

The present example corresponds to the optical fiber design as shown in FIG. 3. In the present example, the refractive index (n1) of the first core (22) is gradually increased from the initial value (n0) over its radius (a1) as shown in the FIG. 3. Unlike the Example 1, the present example is designed taking a center dip that occurs during MCVD (modified chemical vapor deposition) process into consideration.

In the present example, the inventors of the present invention intended to implement the optical fiber, which has the dispersion of 2.5–3.5 ps/nm-km at the wavelength of 1550 nm, the effective area of 60–65 $\mu m^2$, and the 32 mmψ bending loss of 0.02 dB or less. The inventors performed a number of simulations by using the numerical method known in the optical fiber design field.

During the simulations, the inventors of the present invention set the ranges of the radii (a1, a2) of the first and second cores (22, 24) as 0.85±0.15 $\mu m$ and 2.7±0.15 $\mu m$ respectively. Also, the inventors set the ranges of index differences of the first core (22), del0(%) and del1(%) as 0.70±0.03% and 0.75±0.03%.

Meanwhile, for the first and second inner clads (32, 34), the inventors set the ranges of their radii (a3, a4) as 7.0±1.5 $\mu m$ and 9.0±1.0 $\mu m$, respectively, and set the ranges of the index differences, del2(%) and del3(%) as 0.10±0.02% and 0.06±0.03%, respectively. Herein, the del0 (%) is defined and calculated from the formula, del0 (%)=[(n0−$n_{silica}$)/ $n_{silica}$]×100 and other index differences del1 (%), del2(%) and del3(%) are defined and calculated from the formulas as described in the Example 1. As the result of the simulation, the inventors found that when the first and second cores (22, 24) and the first and second inner clads (32, 34) were designed to have the values within the above ranges, the resultant optical fiber had the optical characteristics which the inventors intended to achieve.

More preferably, the inventors of the present invention set the radii (a1, a2, a3 and a4) of the first and second cores (22, 24), and the first and second inner clads (32, 34) as fixed values, i.e., 0.85 $\mu m$, 2.7 $\mu m$, 7.0 $\mu m$ and 9.0 $\mu m$, respectively. In addition, the inventors set the index differences, del0(%), del1(%), del2(%) and del3(%) as fixed values, 0.70%, 0.75%, 0.10% and 0.06%. These fixed values correspond to the center values of the ranges as mentioned above. The inventors found that the optical fiber design having the above fixed values made it possible to implement the optical fiber having the most desirable optical characteristics. If the optical fiber were designed and fabricated with the above values, the resultant optical fiber has the following optical characteristics: the dispersion of 3.0 ps/nm-km, the effective area of 60 $\mu m^2$, the cutoff wavelength of 1430 nm and the 32 mmψ bending loss of 0.01 dB or less.

Like the Example 1, the optical fiber according to the present example can suppress the non-linear effects including the four wave mixing when it is used for the wavelength division multiplexing optical communication system. Furthermore, the optical fiber according to the present example can prevent the optical characteristics of the resultant optical fiber from changing due to the center dip which happens to occur during the MCVD process.

Hereinafter, an influence that the radii (a3, a4) and the index differences del2(%), del3(%) of the first and second inner clads (32, 34) have on the entire optical characteristics of the optical fiber when the optical fiber is designed according to the above Example 1 will be explained. The radii and the index difference of the first and second cores (22, 24) are set to have the center values of the ranges, which are described in the Example 1, in order to clearly find the influence of the first and second inner clads (32, 34) on the optical characteristics of the optical fiber. The design characteristics of the first and second cores (22, 24) results in the optical fiber having the dispersion of 1.5–3.5 ps nm-km at the wavelength of 1550 nm. Subsequently, the design characteristics of the first and second inner clads (32, 34) are made to change within the ranges described in the Example 1.

Figure 4:
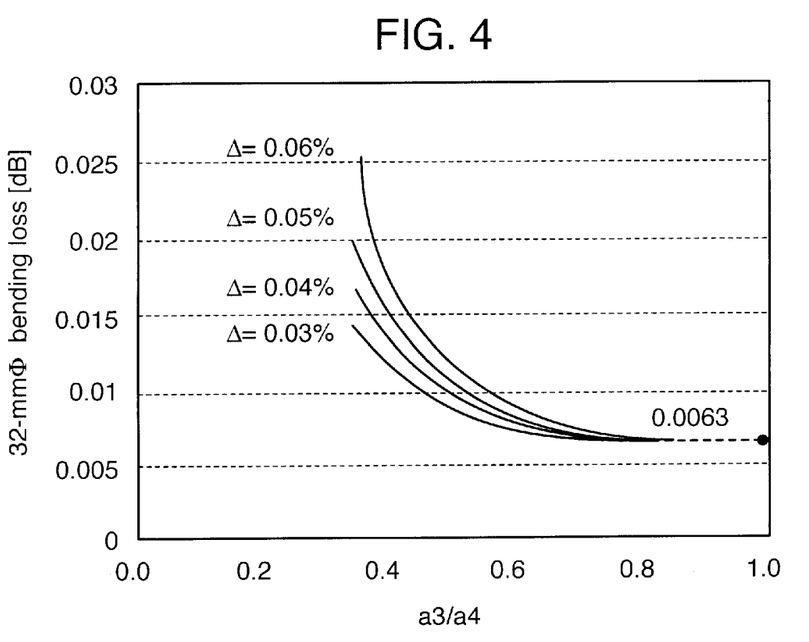
FIG. 4 is a graph representing the bending loss depending on a3/a4 and del2(%)–del3(%) according to one example of the present invention.
Figure 5:
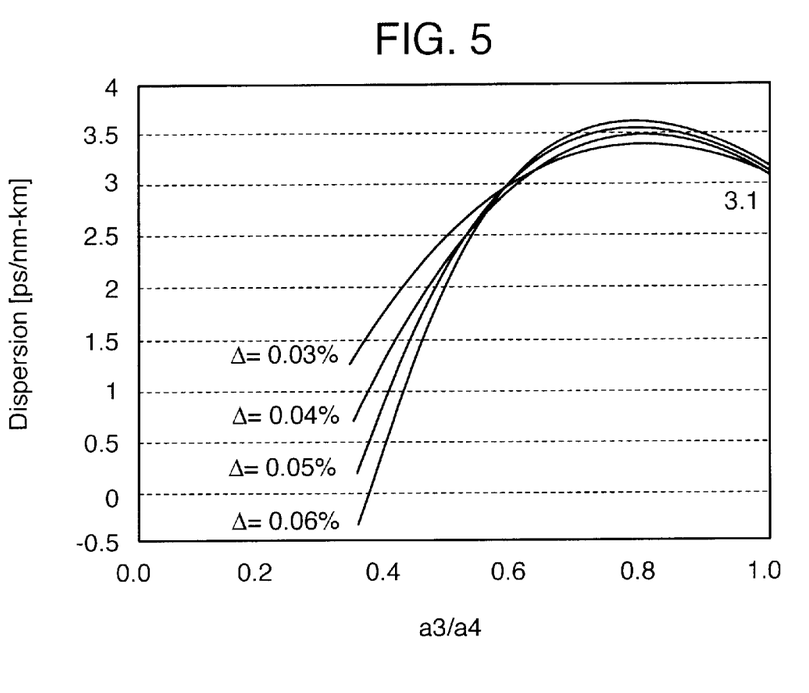
FIG. 5 is a graph representing the dispersion at the wavelength of 1550 nm depending on a3/a4 and del2(%)–del3(%) according to one example of the present invention.
Figure 6:
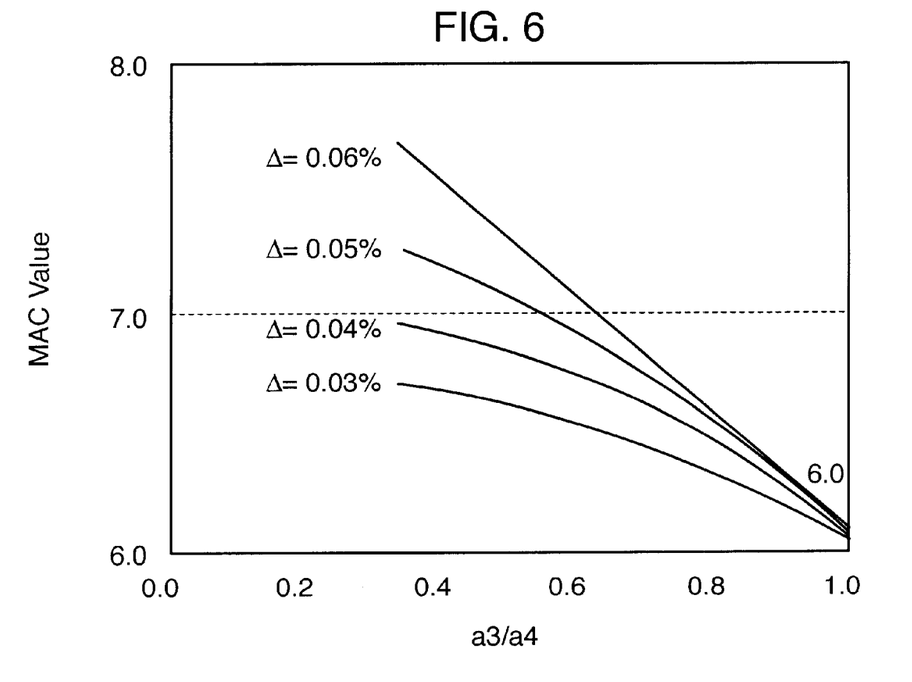
FIG. 6 is a graph representing the MAC value depending on a3/a4 and del2(%)–del3(%) according to one example of the present invention.
Figure 7:
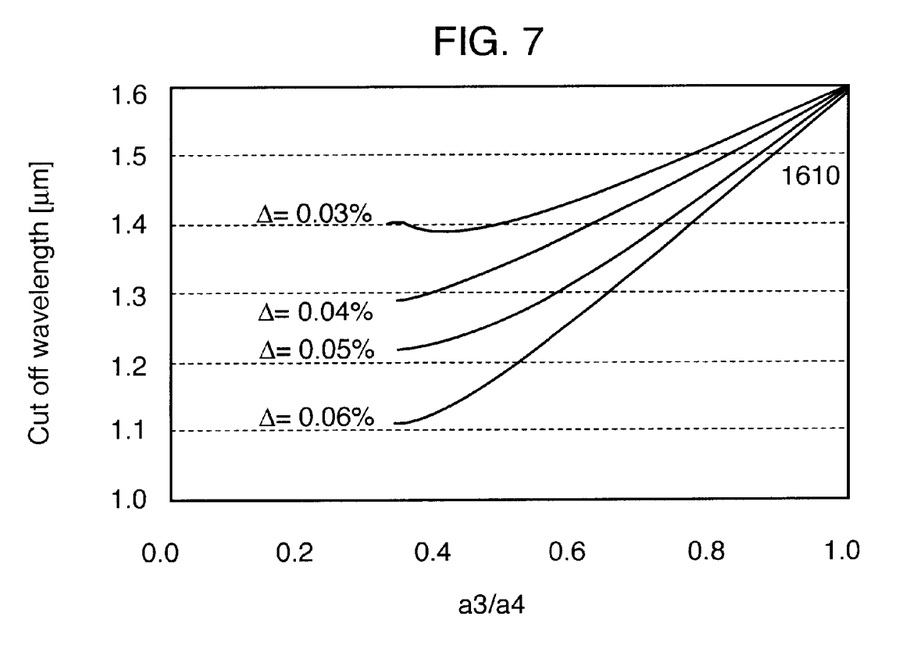
FIG. 7 is a graph representing a cutoff wavelength depending on a3/a4 and del2(%)–del3(%) according to one example of the present invention.
Figure 8:
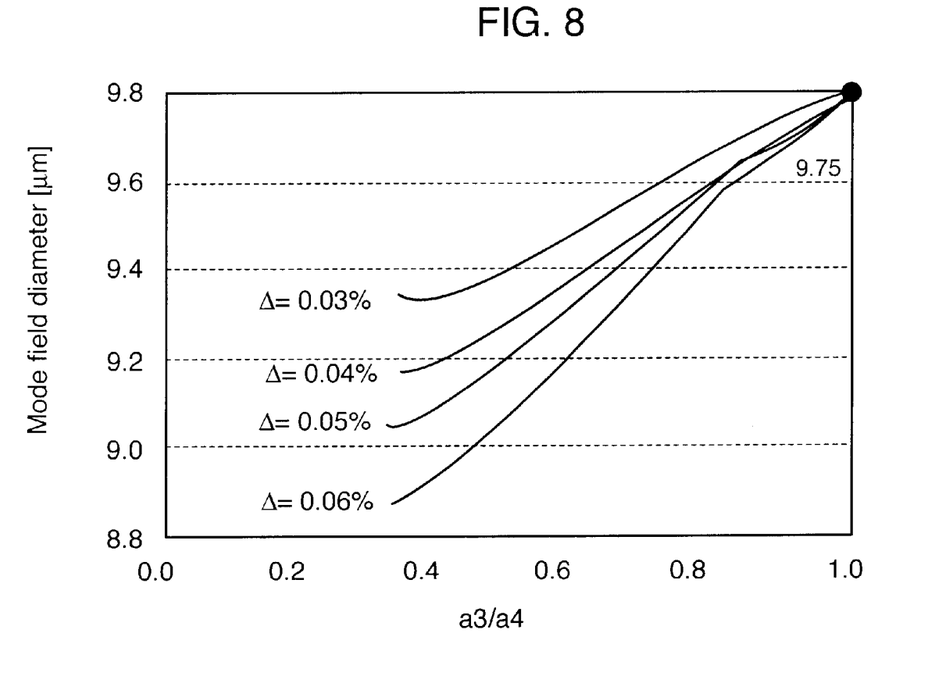
FIG. 8 is a graph representing a mode field diameter at the wavelength of 1550 nm depending on a3/a4 and del2(%)–del3(%) according to one example of the present invention.
Figure 9:
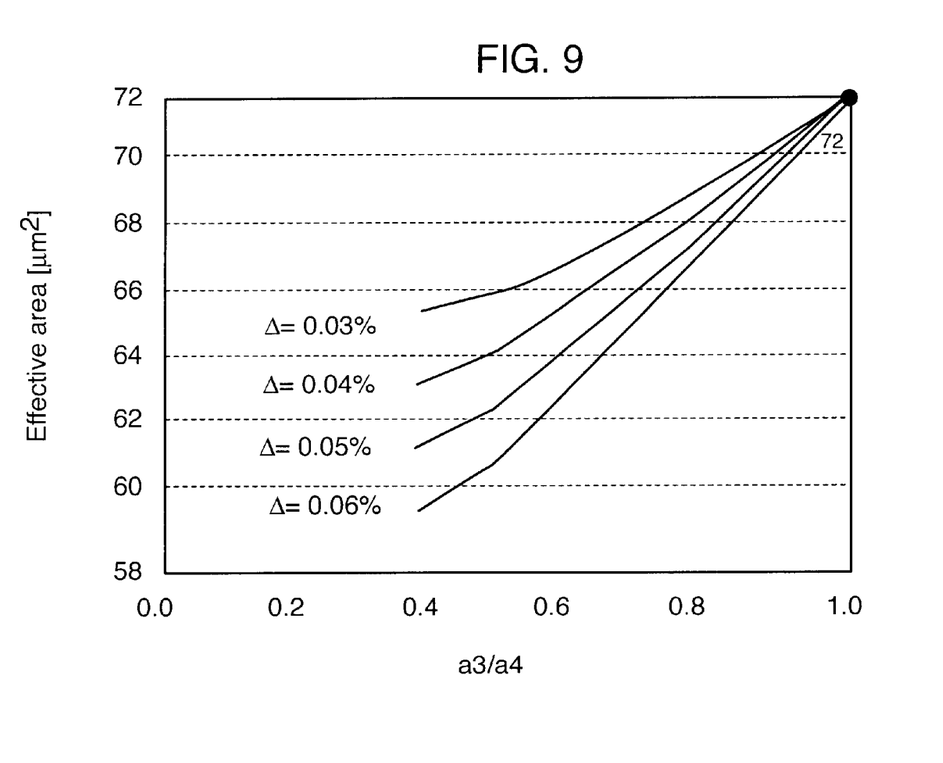
FIG. 9 is a graph representing an effective area at the wavelength of 1550 nm depending on a3/a4 and del2(%)–del3(%) according to one example of the present invention.

Specifically, FIGS. 4 to 9 show changes in the bending loss, dispersion, MAC value, cutoff wavelength, mode field diameter and effective area, respectively, when the radii of the first and second cores (22, 24) are 1.0 μm and 2.3 μm and the index difference del1(%) is 0.73%. FIGS. 4 and 5 are graphs showing the bending loss change and the dispersion change at the wavelength of 1550 nm depending on the a3/a4 and del2(%)–del3(%) in the optical fiber which are designed according to the Example 1. FIGS. 6 and 7 are graphs showing the MAC value change and the cutoff wavelength change at the wavelength of 1550 nm depending on the a3/a4 and del2(%)–del3(%) in the optical fiber which are designed according to the Example 1. FIG. 8 shows the mode field diameter change at the wavelength of 1550 nm and FIG. 9 shows the effective area change at the wavelength of 1550 nm in the optical fiber which are designed according to the Example 1.

In FIGS. 4 and 5 it is found that the bending loss and the dispersion changes are significantly small when a3/a4 is equal to or larger than 0.5. Also, as shown in FIGS. 7 and 9, the changes of the cutoff wavelength and the effective area are relatively increased when the a3/a4 is equal to or larger than 0.5. In conclusion, FIGS. 4 to 9 indicate that the effective area is increased but the bending loss is not increased anymore as the a3/a4 is increased. This result is contrary to the general principle that the increased effective area results in the increased bending loss. The result is explained based on FIGS. 6 to 8.

FIG. 6 shows the change of MAC value, which is to divide the mode field diameter by cutoff wavelength. The MAC value is an index used in indirectly representing the bending loss and, typically, since the MAC value is decreased as the bending loss is decreased, it is possible for the MAC value to represent the degree of the bending loss. FIG. 6 shows that the MAC value is decreased as the a3/a4 is increased and this is consistent with the FIG. 4 showing that the bending loss is decreased as the a3/a4 is increased. Thus, when the a3/a4 is large, the effective area is also large, whereas the bending loss is small. The reason why the MAC value is decreased as the a3/a4 is increased is that the mode field diameter changes much more than the cutoff wavelength does. Such effects are shown in FIGS. 7 and 8.

Thus, when the a3/a4 lies in the range of 0.5 to 0.8 and the del2(%)–del3(%) lies in the range of 0.04% to 0.06%, the optical fiber according to the present invention can have a large effective area of 60–70 μm², the bending loss of 0.015 dB or less and the dispersion of 2–4 ps/nm-km at the wavelength of 1550 nm which makes it possible to suppress the non-linear effects.

It is described that the optical fiber according to the present invention consists of two cores and clads but the present invention is not limited to such descriptions. Taking the fabrication of the optical fiber and the control of the optical characteristics into consideration, it is easily understood for the skilled person in the art that the optical fiber according to the present invention may include either one core or three or more cores.

INDUSTRIAL APPLICABILITY

As it can be understood from the above descriptions, the present invention is related to an optical fiber which is suitable for long distance and broad band signal transmission system. The optical fiber according to the present invention includes a core corresponding to a center portion of the optical fiber; an inner clad surrounding the core; and a silica clad surrounding the inner clad. The core consists of a first core having a predetermined refractive index and a second core having a refractive index smaller than that of the first core. The inner clad consists of a first clad having a refractive index smaller than that of the second core and a second clad having a refractive index smaller than that of the first inner clad. The silica clad has a refractive index smaller than that of the second inner clad and surrounds the second inner clad.

Based on the above structure, the present invention can provide an excellent optical fiber whose effective area is large but bending loss is small. Also, the optical fiber according the present invention has a simple refractive index profile and so can be easily fabricated.

Various other modifications will be apparent to and can be readily made by those skilled in the art without departing from the scope and the spirit of the present invention. Accordingly, it is not intended that the scope of the claims appended hereto be limited to the description as set forth herein, but rather that the claims be broadly construed.

What is claimed is:

1. A dispersion shifted optical fiber, comprising:

a core having a refractive index distribution ($n_{core}$);

an inner clad surrounding the core and having a refractive index distribution ($n_{clad}$); and, a silica clad surrounding the inner clad and having a refractive index ($n_{silica}$);

wherein the core comprises:
  a first core having a refractive index (n1) that is uniform over its radius (a1); and
  a second core surrounding the first core and having a refractive index (n2) that is gradually decreased over its radius (a2); and, wherein the inner clad comprises:
  a first inner clad surrounding the second core and having a refractive index (n3) that is uniform over its radius (a3); and
  a second inner clad surrounding the first inner clad and having a refractive index (n4) that is uniform over its radius (a4); and, wherein the refractive indices of the first and second cores, the first and second clads and the silica clad satisfy a relationship of $n1>n2>n3>n4>n_{silica}$;

wherein the optical fiber has dispersion of the 1.5~3.5 ps/nm-km at a wavelength of 1550 nm, an effective area of 60~70 μm2 and a 32 mmψ bending loss of 0.02 dB or less;

wherein a radius of the first core (a1), a radius of the second core (a2), a radius of the first inner clad (a3) and a radius of the second inner clad (a4) are 1.0±0.15 μm, 2.3±0.15 μm, 6.5±1.5 μm and 9.0±1.0 μm, respectively; and refractive index differences del1(%), del2(%) and del3(%) are 0.73±0.03%, 0.11±0.03% and 0.07±0.03%, respectively, wherein del1(%) is calculated from the formula (1) below; del2(%) is calculated from the formula (2) below; and del3(%) is calculated from the formula (3) below;

$$del1(\%)=[(n1-n_{silica})/n_{silica}]\times 100; \quad (1)$$

$$del2(\%)=[(n2-n_{silica})/n_{silica}]\times 100; \quad (2)$$

$$del3(\%)=[n3-n_{silica})/n_{silica}]\times 100 \quad (3).$$

2. The optical fiber as claimed in claim 1, wherein the refractive index (n2) of the second core is linearly decreased over its radius (a2).

3. A dispersion shifted optical fiber, comprising:
a core having a refractive index distribution ($n_{core}$):
an inner clad surrounding the core and having a refractive index distribution ($n_{clad}$); and,
a silica clad surrounding the inner clad and having a refractive index ($n_{silica}$);
wherein the core comprises:
a first core having a predetermined refractive index (n1) that is gradually increased from an initial refractive index (n0) over its radius (a1); and
a second core surrounding the first core and having a refractive index (n2) that is gradually decreased over its radius (a2); and,
wherein the inner clad comprises:
a first inner clad surrounding the second core and having a refractive index (n3) that is uniform over its radius (a3); and
a second inner clad surrounding the first inner clad and having a refractive index (n4) that is uniform over its radius (a4); and
wherein a maximum refractive index of the second core is larger than a minimum refractive index of the first core and the refractive indices of the second core, the first and second inner clads and the silica clad have a relationship of $n2>n3>n4>n_{silica}$;
wherein the optical fiber has the dispersion of 1.5~3.5 ps/nm-km at a wavelength of 1550 nm, an effective area of 60~70 μm2 and a 32 mmψ bending loss of 0.02 dB or less;
wherein a radius of the first core (a1), a radius of the second core (a2), a radius of the first inner clad (a3) and a radius of the second inner clad (a4) are 0.85±0.15 μm, 2.7±0.15 μm, 7.0±1.5 μm and 9.0±1.0 μm, respectively; and refractive index differences del0(%), del1(%), del2(%) and del3(%) are 0.70±0.03%, 0.75±0.03%, 0.10±0.02% and 0.06±0.03%, respectively, wherein del0(%) is calculated from the formula (1) below; del1(%) is calculated from the formula (2) below; del2(%) is calculated from the formula (3) below; and, del3(%) is calculated from the formula (4) below;

$$del0(\%)=[(n0-n_{silica})/n_{silica}]\times100; \quad (1)$$

$$del1(\%)=[(n1-n_{silica})/n_{silica}]\times100; \quad (2)$$

$$del2(\%)=[(n2-n_{silica})/n_{silica}]\times100; \quad (3)$$

$$del3(\%)=[(n3-n_{silica})/n_{silica}]\times100 \quad (4).$$

4. The optical fiber as claimed in claim 3, wherein the refractive index (n2) of the second core is linearly decreased over its radius (a2).

5. The optical fiber as claimed in claim 1, wherein a ratio of a radius of the first inner clad (a3) to a radius of the second inner clad (a4) ranges from 0.5 to 0.8.

6. The optical fiber as claimed in claim 1, wherein the index difference del2(%) minus the index difference del3(%) ranges from 0.04% to 0.06%.

7. A dispersion shifted optical fiber, comprising:
a core having a refractive index distribution ($n_{core}$);
an inner clad surrounding the core and having a refractive index distribution ($n_{clad}$); and,
a silica clad surrounding the inner clad and having a refractive index ($n_{silica}$);
wherein the core comprises:
a first core having a refractive index (n1) that is uniform over its radius (a1); and
a second core surrounding the first core and having a refractive index (n2) that is gradually decreased over its radius (a2); and,
wherein the inner clad comprises:
a first inner clad surrounding the second core and having a refractive index (n3) that is uniform over its radius (a3); and
a second inner clad surrounding the first inner clad and having a refractive index (n4) that is uniform over its radius (a4); and,
wherein the refractive indices of the first and second cores, the first and second clads and the silica clad satisfy a relationship of $n1>n2>n3>n4>n_{silica}$;
wherein the optical fiber has disperson of the 1.0~6.0 ps/nm-km at a wavelength of 1550 nm, a dispersion slope of 0.06 ps/nm2-km, an effective area of 50 μm2 or more and a 32 mmψ bending loss of 0.01 dB or less at 1550 nm and 1620 nm wavelengths;
wherein a radius of the first core (a1), a radius of the second core (a2), a radius of the first inner clad (a3) and a radius of the second inner clad (a4) are 1.0±0.15 μm, 2.5±0.15 μm, 3.5±1.5 μm and 6.0±1.0 μm, respectively; and refractive index differences del1(%), del2(%) and del3(%) are 0.75±0.03%, 0.15±0.02% and 0.10±0.03%, respectively, wherein del1(%) is calculated from the formula (1) below; del2(%) is calculated from the formula (2) below; and del3(%) is calculated from the formula (3) below;

$$del1(\%)=[(n1-n_{silica})/n_{silica}]\times100; \quad (1)$$

$$del2(\%)=[(n2-n_{silica})/n_{silica}]\times100; \quad (2)$$

$$del3(\%)=[(n3-n_{silica})/n_{silica}]\times100 \quad (3).$$

* * * * *